July 5, 1966 C. VAN DER LELY ETAL 3,258,901
COMBINE HARVESTERS
Filed Feb. 24, 1965 2 Sheets-Sheet 1
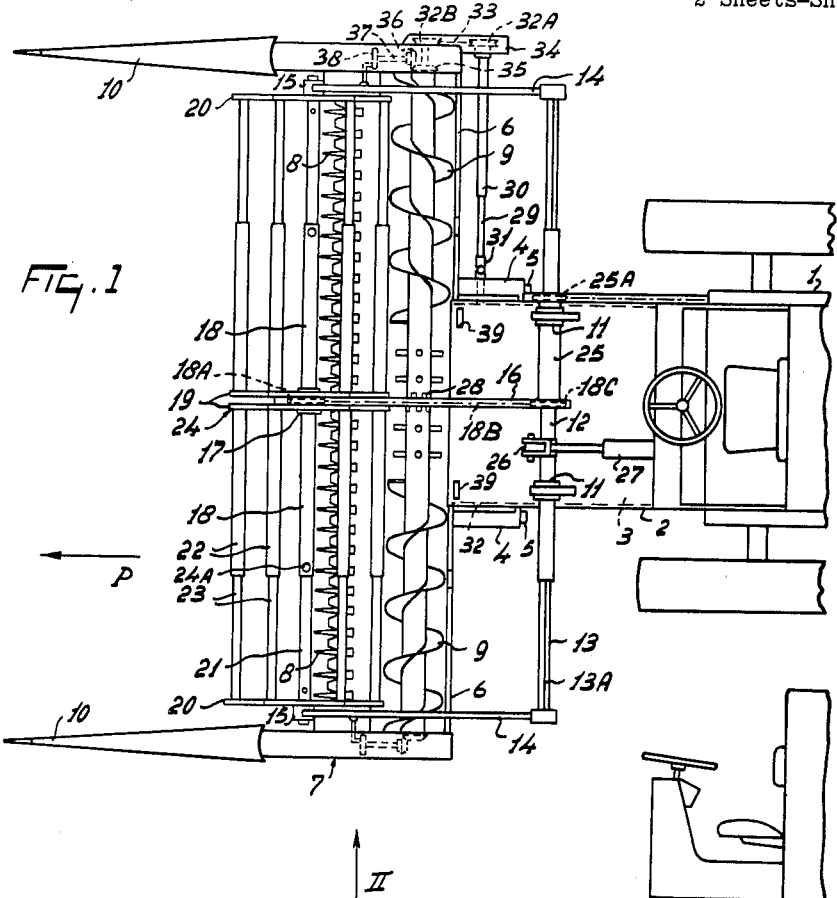
INVENTOR.
CORNELIS VAN DER LELY
LEENDERT VAN WINGERDEN
BY
Mason, Mason & Albright
Attorneys INVENTOR.
CORNELIS VAN DER LELY
LEENDERT VAN WINGERDEN
BY
Mason, Mason & Albright
Attorneys United States Patent Office 3,258,901
Patented July 5, 1966

3,258,901
COMBINE HARVESTERS
Cornelis van der Lely, Zug, Switzerland, and Leendert van Wingerden, Dubbeldam, Netherlands, assignors to C. van der Lely N.V., Maasland, Netherlands, a Dutch limited-liability company
Filed Feb. 24, 1965, Ser. No. 434,863
Claims priority, application Netherlands, Mar. 5, 1964, 6,402,194
10 Claims. (Cl. 56—20)

This invention relates to combine harvesters.

It is an object of the invention to provide combine harvesters with relatively large cutting widths which can be readily adjusted into transport positions suitable for movement of the combine harvesters through relatively narrow gates or along narrow roads.

In accordance with the invention there is provided a combine harvester wherein the mowing table or platform thereof comprises at least two portions which as a whole are each upwardly and downwardly turnable relative to the frame of the combine harvester about a corresponding axis.

Figure 3:
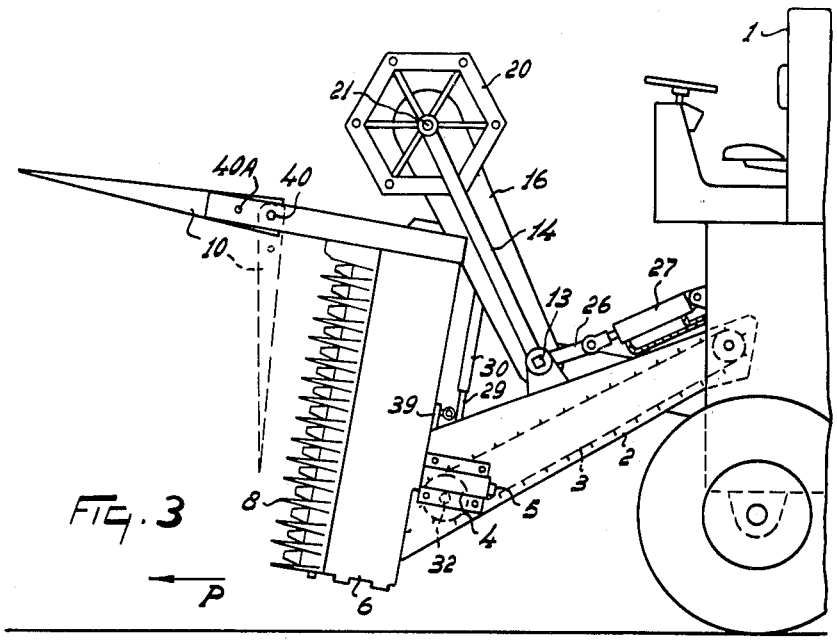
Figure 4:
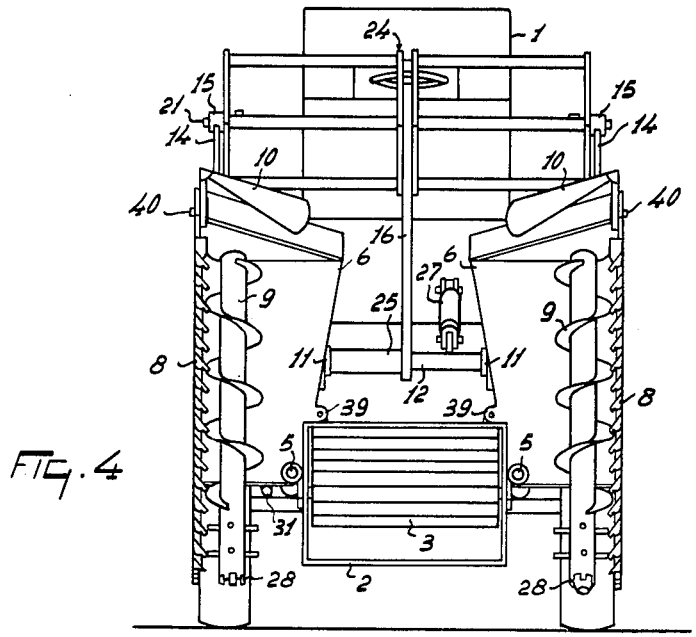

For a better understanding of the invention and to show how the same may be readily carried into effect, reference will now be made, by way of example, to the accompanying drawings in which:

FIGURE 1 is a plan view of a forward portion of a self-propelled combine harvester in accordance with the invention, FIGURE 2 is a side view taken in the direction of the arrow II in FIGURE 1, FIGURE 3 is a side view taken in the same direction as that of FIG. 2 but showing the forward portion in a transport position, and FIGURE 4 is a front view also showing the transport position.

Referring now to the drawings, there is shown the forward portion of a self-propelled combine harvester which comprises an elevator housing 2 mounted on a frame 1, which housing 2 receives an endless elevator chain 3 adapted to carry cut crop to a threshing drum. The housing 2 has bearings 4 mounted at its forward end, one bearing on each of its two opposite sides. Each bearing 4 receives a pivotal shaft 5 which extends substantially horizontally and in the intended direction of travel P. The forward end of each shaft 5 is connected to a portion 6 of a mowing table or platform 7. Thus portions 6 are provided which are symmetrically identical to each other and together form the whole mowing table 7. Each portion 6 constitutes a support for a corresponding cutter bar 8 and auger 9 arranged behind said cutter bar 8. The outer side of each portion 6 carries a crop divider 10 which extends in the intended direction of travel P. The upper side of the housing 2 carries two bearings 11 which receive a hollow shaft 12 extending perpendicular to the direction P. Each opposite end of the hollow shaft 12 receives a corresponding shaft 13, which shafts 13 are slidably received within the hollow shaft 12 and are secured against rotation relative thereto by means of guides 13A which may, for example, take the form of splines received in corresponding grooves formed in the interior of the hollow shaft 12. The outermost ends of the shafts 13 carry arms 14 which extend downwardly in the general direction P, said arms 14 carrying bearings 15 at their ends remote from the shafts 13.

Approximately mid-way between the ends of the shaft 12 it carries a housing 16 which extends parallel to the arms 14. The housing 16 carries a bearing 17 at its end remote from the shaft 12, which bearing 17 receives a hollow shaft 18 which extends perpendicular to the direction P. The shaft 18 carries two hexagonal supports 19, one on each side of the housing 16. Supports 20 similar to the supports 19 are arranged on the outermost ends of the shafts 21 received within the bearings 15 which are carried by the arms 14. The other ends of the shafts 21 are received within the hollow shaft 18. Each support 19 carries six tubes 22 which extend perpendicular to the direction P and outwardly towards the supports 20, and beams 23 which correspond in position and number to the tubes 22 are slidably received within same. The supports 19 and 20 and the tubes and beams 22 and 23 comprise a reel 40 of the combine harvester. Thus the hollow shafts 12 and 18 together with the tubes 22 define a central portion of the combine harvester and shafts 13 and 21 and beams 23 respectively are slidable inwardly with regard to said hollow shafts and tubes of the central portion. This inward movement is perpendicular to the direction P and can occur when locking pins 24A, which are entered through aligned holes in the hollow shaft 18 and the shafts 21, are withdrawn.

The shaft 18 carries a pulley 18A within the housing 16, said pulley 18A being linked to a pulley 18C mounted on the shaft 12 within the housing 16 through a rope or belt 18B. The pulley 18C is fastened to a sleeve 25 rotatably mounted on the shaft 12 and adapted to be driven through a sprocket 25A by the engine of the combine harvester. The shaft 12 has an arm 26 secured thereto, which arm 26 is pivotally connected to a double-acting hydraulic ram cylinder 27. Actuation of the hydraulic cylinder 27 causes the arm 26 to turn the shaft 12 whereby the reel, generally indicated by the reference numeral 24, is raised or lowered. The portions 6 of the mowing table 7 and the cutter bars 8 and augers 9 supported thereby are so constructed that, during operation, the cutter bars 8 co-operate with each other and so also can the augers 9. The augers 9 co-operate with each other by means of suitable couplings arranged on their inner adjacent ends, namely claw and matching socket couplings 28 (see FIGS. 1 and 4). The augers 9 are driven by means of two telescopically slidable shafts 29 and 30 which extend from the right hand side of the elevator housing 2 with respect to the direction P. The shaft 29 is coupled with a driving shaft 32 of the elevator chain 3 through a universal joint 31. The end of the shaft 30 remote from the elevator housing 2 carries a pulley 32A which co-operates with a pulley 32B mounted on the shaft of the right hand auger 9. The pulleys 32A and 32B and a rope or belt 33 interconnecting same are surrounded by a protecting hood 34. The two augers 9 carry bevel gears 35 which are mounted on the outermost ends of the augers, said bevel gears 35 being adapted to co-operate with bevel gears 36 mounted on shafts 37 which extend in the direction P. The shafts 37 carry gear wheels 38 at their forward ends, which gear wheels 38 have arms eccentrically connected thereto, said arms being connected to the cutter bars 8 whereby reciprocatory movement is imparted to both the cutter bars 8 by the gear wheels 37.

The operation of the combine harvester will now be described. The combine harvester is moved in the direction of the arrow P and both the portions 6 which form the mowing table 7 can turn about a corresponding pivotal axis afforded by the shafts 5 to match any unevenness in the ground. The cutter bars 8 and augers 9 associated with each portion 6 are so located relative to each other that crop cut by the cutter bars 8 is fed to the elevator housing 2 and therefrom to the threshing drum. When it is desired to bring the combine harvester into a transport position, the shafts 13 are turned in the direction of the arrow A (FIG. 2) when the hydraulic cylinder 27 is actuated. The reel 24 then occupies the position shown in FIG. 3. After this the width of the reel can be reduced by first withdrawing the pins 24A which prevent relative axial movement between the shafts 18 and 21. Following this the shafts 13 are urged inwardly relative to the hollow shaft 12, the shafts 21 are urged inwardly relative to the shaft 18 and the beams 23 are urged inwardly relative to the tubes 22. The reel 24 then takes up a configuration as shown in FIG. 4. The elevator housing 2 can then be raised in a conventional manner using for example, a hydraulic lifting cylinder which extends between the frame 1 upwardly therefrom to the housing 2. The two portions 6 as a whole are turned inwardly about an axis afforded by a shaft 5 and can be fixed in a substantially vertical setting by means of locking devices 39. While the portions 6 are being turned inwardly, no difficulty is encountered with the drive to the cutter bars 8 and augers 9 since this is obtained through telescopically arranged shafts 29 and 30 and a universal joint 31. The crop dividers 10 are turnably mounted on shafts 40 which extend vertically during normal working of the combine harvester. The crop dividers 10 are prevented from turning about the shafts 40 by means of locking pins 40A entered through aligned holes in the crop dividers 10 and bottom walls of the portions 6. However, when the portions 6, cutter bars 8 and augers 9 are in a transport position and the locking pins 40A are withdrawn, then the crop dividers 10 take up the position shown in broken lines in FIG. 3. In this position they can act so as to protect the cutter bars 8 from damage.

Thus the construction in accordance with the invention is particularly applicable to combine harvesters having relatively large cutting widths which can readily be converted into a transport position and thus greatly facilitate movement of the combine harvester through narrow gates or along public or other roads. The mowing table comprises two portions which are each turnable upwardly about a corresponding shaft and the width of the reel can be readily reduced to about 2.2 metres. Also the pivotal mounting of the portions 6, cutter bars 8 and augers 9 on the shafts 5 allows the mowing table to match, during working operation, any unevennesses in the ground, each portion 6 moving independently of the other. Thus combine harvesters having a large cutting width can operate more effectively.

What we claim is:

1. A combine harvester having a frame and a mowing table, said table comprising at least two portions of substantially the same size, each portion being supported on a substantially horizontal shaft extending in the general direction of travel whereby said portions are turnable about said shafts during operation to match unevenness of the ground.

2. A combine harvester having a frame and a mowing table, a reel rotatably mounted above said table, said reel comprising at least two sections, at least one section being slidable relative to another section in a direction substantially parallel to the axis of rotation of said reel, said reel including a central part, one of said sections being disposed on each side of said central part and displaceably connected to said central part, an elevator and housing mounted on said frame, said mowing table comprising at least two substantially identical portions which are turnable relative to said frame substantially vertically in transport position, said reel being movable into transport position by being turned upwardly about a shaft provided on said housing, said sections being displaced inwardly towards said central part and said reel being located above said mowing table in transport position.

3. A combine harvester as claimed in claim 2, wherein a locking device is provided for fixing the portions in transport position.

4. A combine harvester having a frame and a mowing table, a reel rotatably mounted above said table, said reel comprising at least two sections, at least one section being slidable relative to another section in a direction substantially parallel to the axis of rotation of said reel, said mowing table comprising at least two substantially identical portions which are turnable relative to said frame substantially vertically to transport position, said portions having crop dividers on their outer sides, each crop divider being turnably mounted relative to its corresponding portion on an axis which extends substantially vertically during normal working of the combine harvester, each of said portions carrying a mowing bar, said portions and mowing bars turnable about a substantially horizontal axis into a transport position, said crop dividers being movable into positions in which they extend in front of corresponding cutter bars in the transport position.

5. A combine harvester as claimed in claim 4, wherein the width of the mowing table is about 2.2 meters when the portions of the mowing table are in transport position.

6. A combine harvester having a frame and a mowing table, said mowing table comprising at least two portions, each of said portions carrying a cutter bar, said portions and cutter bar being turnable about a substantially horizontal axis into a transport position, the said portions carrying crop-dividers on at least their outer sides, each crop-divider being turnably mounted relative to its corresponding portion on an axis which extends substantially vertically during normal working of the combine harvester, said crop-dividers being movable into positions in which they extend in front of corresponding cutter bars in the transport position of the said portions.

7. A combine harvester as claimed in claim 1, wherein each portion carries a cutter bar and each cutter bar is connectable in working engagement with the cutter bar of an adjacent portion.

8. A combine harvester as claimed in claim 1, wherein each portion includes an auger arranged behind the cutter bar carried by said portion.

9. A combine harvester as claimed in claim 1, wherein said portions are turnable to a substantially vertical position during transport.

10. A combine harvester as claimed in claim 1, wherein said portions are turnable about said shafts during operation to match unevenness of the ground.

References Cited by the Examiner

UNITED STATES PATENTS

| 539,829 | 5/1895 | Schneider | 56—227 |
|---|---|---|---|
| 650,273 | 5/1900 | Potter. | |
| 688,128 | 12/1901 | Schaill et al. | 56—159 |
| 952,249 | 3/1910 | Huddle et al. | 56—227 |
| 1,724,300 | 8/1929 | Moncreiffe | 56—21 |
| 1,859,208 | 5/1932 | Kane | 56—319 |
| 2,224,970 | 12/1940 | Lindgren et al. | 56—20 |
| 2,603,052 | 7/1952 | Pelham | 56—25 |
| 2,873,567 | 2/1959 | Vogelaar et al. | 56—221 |
| 3,066,465 | 12/1962 | Fischer | 56—25 |

FOREIGN PATENTS

| 224,552 | 4/1962 | Austria. |
|---|---|---|

ANTONIO F. GUIDA, *Acting Primary Examiner.*

UNITED STATES PATENT OFFICE
CERTIFICATE OF CORRECTION

Patent No 3,258,901                                July 5, 1966

Cornelis van der Lely et al.

It is hereby certified that error appears in the above numbered patent requiring correction and that the said Letters Patent should read as corrected below.

Column 3, lines 49 and 50, strike out "during operation to match unevenness of the ground" and insert instead -- and elevator housing means being mounted on said frame adjacent said table, one of said shafts being mounted on each side of said elevator housing. --.

Signed and sealed this 26th day of September 1967.

(SEAL)
Attest:

ERNEST W. SWIDER                              EDWARD J. BRENNER
Attesting Officer                                    Commissioner of Patents